（12） United States Patent
Broman et al.

(10) Patent No.: US 9,111,407 B2
(45) Date of Patent: *Aug. 18, 2015

(54) SPEAKER RECOGNITION AND DENIAL OF A TRANSACTION BASED ON MATCHING A KNOWN VOICE PRINT

(75) Inventors: Vicki Broman, Paradise Valley, AZ (US); Vernon Marshall, Montclair, NJ (US); Seshasayee Bellamkonda, Glendale, AZ (US); Marcel Leyva, Chandler, AZ (US); Cynthia Hanson, Minneapolis, MN (US)

(73) Assignee: III Holdings 1, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/227,219

(22) Filed: Sep. 7, 2011
(Under 37 CFR 1.47)

(65) Prior Publication Data
US 2011/0320200 A1   Dec. 29, 2011

Related U.S. Application Data

(63) Continuation of application No. 12/832,925, filed on Jul. 8, 2010, now Pat. No. 8,036,892, which is a continuation of application No. 11/862,079, filed on Sep. 26, 2007, now Pat. No. 7,778,832, which is a continuation of application No. 10/448,552, filed on May 30, 2003, now Pat. No. 7,299,177.

(51) Int. Cl.
*G10L 17/00* (2013.01)
*G07F 7/10* (2006.01)
(Continued)

(52) U.S. Cl.
CPC ............ *G07F 7/1008* (2013.01); *G06Q 20/341* (2013.01); *G06Q 20/3558* (2013.01); *G06Q 20/40145* (2013.01)

(58) Field of Classification Search
CPC ....... G01L 17/00; G01L 17/005; G01L 17/04; G01L 17/20; G01L 17/22; G01L 17/26
USPC .......................... 704/246, 247, 249, 250, 273
See application file for complete search history.

(56) References Cited

U.S. PATENT DOCUMENTS

| 4,712,243 A | 12/1987 | Ninomiya et al. |
| 4,961,229 A | 10/1990 | Takahashi |

(Continued)

OTHER PUBLICATIONS

USPTO; All Office Actions (Non-Final, Final, Advisory Actions, Restrictions/Elections, etc.), Notices of Allowance, 892s, 1449s and SB/08As from U.S. Appl. Nos. 12/832,925; 11/862,079; 10/448,552.

(Continued)

*Primary Examiner* — Qi Han
(74) *Attorney, Agent, or Firm* — Meyertons, Hood, Kivlin, Kowert & Goetzel, P.C.

(57) ABSTRACT

One-to-many comparisons of callers' voice prints with known voice prints to identify any matches between them. When a customer communicates with a particular entity, such as a customer service center, the system makes a recording of the real-time call including both the customer's and agent's voices. The system segments the recording to extract at least a portion of the customer's voice to create a customer voice print, and it formats the segmented voice print for network transmission to a server. The server compares the customer's voice print with multiple known voice prints to determine any matches, meaning that the customer's voice print and one of the known voice prints are likely from the same person. The identification of any matches can be used for a variety of purposes, such as determining whether to authorize a transaction requested by the customer.

19 Claims, 5 Drawing Sheets

(51) Int. Cl.
*G06Q 20/34* (2012.01)
*G06Q 20/40* (2012.01)

(56) References Cited

U.S. PATENT DOCUMENTS

| | | | |
|---|---|---|---|
| 5,027,407 A | | 6/1991 | Tsunoda |
| 5,054,083 A | | 10/1991 | Naik et al. |
| 5,265,191 A | | 11/1993 | McNair |
| 5,329,609 A | | 7/1994 | Sanada et al. |
| 5,369,699 A | * | 11/1994 | Page et al. .................. 379/38 |
| 5,521,967 A | | 5/1996 | Novas et al. |
| 5,579,046 A | | 11/1996 | Mitsuhashi et al. |
| 5,608,784 A | | 3/1997 | Miller |
| 5,623,539 A | * | 4/1997 | Bassenyemukasa et al. ................... 379/88.02 |
| 5,802,251 A | | 9/1998 | Cohen et al. |
| 5,893,057 A | | 4/1999 | Fujimoto et al. |
| 5,940,476 A | | 8/1999 | Morganstein et al. |
| 5,940,799 A | * | 8/1999 | Bruckert et al. .............. 704/273 |
| 6,141,644 A | * | 10/2000 | Kuhn et al. ................... 704/273 |
| 6,161,090 A | | 12/2000 | Kanevsky et al. |
| 6,205,204 B1 | | 3/2001 | Morganstein et al. |
| 6,219,639 B1 | | 4/2001 | Bakis et al. |
| 6,246,751 B1 | * | 6/2001 | Bergl et al. .................. 379/67.1 |
| 6,263,311 B1 | | 7/2001 | Dildy |
| 6,266,640 B1 | | 7/2001 | Fromm |
| 6,282,268 B1 | | 8/2001 | Hughes et al. |
| 6,292,782 B1 | | 9/2001 | Weideman |
| 6,356,868 B1 | | 3/2002 | Yuschik et al. |
| 6,396,919 B1 | * | 5/2002 | Shimada et al. ......... 379/265.12 |
| 6,401,066 B1 | | 6/2002 | McIntosh |
| 6,421,645 B1 | | 7/2002 | Beigi et al. |
| 6,427,137 B2 | | 7/2002 | Petrushin |
| 6,463,412 B1 | | 10/2002 | Baumgartner et al. |
| 6,477,500 B2 | | 11/2002 | Maes |
| 6,480,826 B2 | | 11/2002 | Pertrushin |
| 6,510,415 B1 | | 1/2003 | Talmor et al. |
| 6,519,565 B1 | | 2/2003 | Clements et al. |
| 6,526,126 B1 | | 2/2003 | Morganstein et al. |
| 6,529,871 B1 | | 3/2003 | Kanevsky et al. |
| 6,529,881 B2 | | 3/2003 | Morganstein et al. |
| 7,299,177 B2 | | 11/2007 | Broman et al. |
| 7,318,032 B1 | * | 1/2008 | Chaudhari et al. ............ 704/254 |
| 7,778,832 B2 | | 8/2010 | Broman et al. |
| 7,805,310 B2 | * | 9/2010 | Rohwer .................... 704/270.1 |
| 2001/0036821 A1 | | 11/2001 | Gainsboro et al. |
| 2002/0152070 A1 | | 10/2002 | Oda |
| 2002/0194003 A1 | * | 12/2002 | Mozer ...................... 704/270.1 |
| 2002/0198806 A1 | | 12/2002 | Blagg et al. |
| 2003/0023440 A1 | | 1/2003 | Chu |
| 2003/0037004 A1 | | 2/2003 | Buffum et al. |
| 2003/0046083 A1 | | 3/2003 | Devinney, Jr. et al. |
| 2003/0221125 A1 | | 11/2003 | Rolfe |
| 2003/0225703 A1 | * | 12/2003 | Angel ............................ 705/64 |
| 2004/0008828 A1 | * | 1/2004 | Coles et al. ................ 379/88.01 |
| 2005/0036589 A1 | * | 2/2005 | Bossemeyer, Jr. ......... 379/88.01 |

OTHER PUBLICATIONS

Advisory Action dated Oct. 4, 2012 in U.S. Appl. No. 13/227,219.
Final Office Action dated Jul. 30, 2012 in U.S. Appl. No. 13/227,219.
Advisory Action dated Jan. 28, 2013 in U.S. Appl. No. 13/366,851.
Office Action dated Jun. 8, 2012 in U.S. Appl. No. 13/366,851.
Final Office Action dated Oct. 22, 2012 in U.S. Appl. No. 13/366,851.
Office Action dated Aug. 26, 2013 in U.S. Appl. No. 13/366,851.

* cited by examiner

SPEAKER RECOGNITION AND DENIAL OF A TRANSACTION BASED ON MATCHING A KNOWN VOICE PRINT

CROSS-REFERENCE TO RELATED APPLICATIONS

This application is a continuation of U.S. patent application Ser. No. 12/832,925 filed on Jul. 8, 2010 entitled "SPEAKER RECOGNITION IN A MULTI-SPEAKER ENVIRONMENT AND COMPARISON OF SEVERAL VOICE PRINTS TO MANY." The '925 application is a continuation of U.S. Pat. No. 7,778,832 issued on Aug. 17, 2010 (aka U.S. Ser. No. 11/862,079 entitled "SPEAKER RECOGNITION IN A MULTI-SPEAKER ENVIRONMENT AND COMPARISON OF SEVERAL VOICE PRINTS TO MANY" filed on Sep. 26, 2007). The '832 patent is a continuation of U.S. Pat. No. 7,299,177 issued on Nov. 20, 2007 (aka U.S. patent application Ser. No. 10/448,552 entitled "SPEAKER RECOGNITION IN A MULTI-SPEAKER ENVIRONMENT AND COMPARISON OF SEVERAL VOICE PRINTS TO MANY" filed on May 30, 2003). All of which are hereby incorporated by reference.

FIELD OF THE INVENTION

The present invention generally relates to limiting fraud, and more particularly, relates to an apparatus and method for performing a one-to-many comparison of voice prints to determine if a particular caller voice print matches any one of many known voice prints in order to perform an action related to a financial transaction account. This invention also relates to method for identifying the tone of a caller's voice in order to improve the quality of customer service.

BACKGROUND OF THE INVENTION

Preventing attempted fraud in telephonic or other transactions involving oral communications is typically important to many entities, particularly when the fraud involves financial transactions. For example, when a person loses a credit card and calls the credit card company to obtain a replacement, the credit card company often wants to ensure that the person calling is the true cardholder. If a person attempts to fraudulently obtain a replacement card of a different cardholder, then the person may use the replacement credit card to make fraudulent charges. The credit card company can often incur significant losses due to these fraudulent charges. Therefore, the credit card company typically desires to reduce or eliminate fraud.

In that regard, credit card companies often implement certain procedures and install technologies in an attempt to verify the identity of customers who call them. One such technology is the use of an Automatic Number Identification (ANI) service, which attempts to identify the telephone number of an incoming call. A credit card company can maintain a database of area codes from which it has historically received a high number of fraudulent callers. If the telephone number of the person calling is within one of those high fraud area codes, the credit card company can flag the call for additional procedures or investigation to verify the true identity of the caller.

However, the ANI service has certain limitations. For example, the ANI service does not easily permit one to pinpoint the exact geographic location of the caller. Also, it is possible that multiple persons can be associated with the same telephone number, which can make it difficult to identify which of those persons is the caller. Ultimately, the ANI service only provides a general indication of whether the caller is from an area known to be associated with a high number of fraudulent transactions. However, if the caller is not calling from one of those high fraud area codes, the ANI service provides no indication to provide additional screening, although the caller may actually be attempting to actually engage in fraud.

Aside from credit card companies, many other entities receive calls from customers and desire a way to verify the true identity of the callers. This verification can be useful, for example, in determining whether to execute a particular transaction requested by a caller. Accordingly, a need exists for a more reliable way to minimize fraud in telephonic transactions or other transactions involving oral communications, or to screen callers for other purposes during those transactions.

SUMMARY OF THE INVENTION

A method and apparatus consistent with the present invention provides for facilitating the analysis of a caller's voice to determine a potential match with known callers' voices. In the method and apparatus, an agent receives a communication from a caller, and an electronic representation is recorded of both the caller's and agent's voices from the real-time telephone call. The electronic representation of the caller's voice is segmented from the agent's voice to produce a caller voice print, and the caller voice print is compared with a plurality of known voice prints to determine if the caller voice print matches any of the known voice prints. An indication of the comparison is output or otherwise transmitted via a network and can be used for a variety of purposes.

BRIEF DESCRIPTION OF THE DRAWINGS

The accompanying drawings, wherein like reference numerals represent like elements, are incorporated in and constitute a part of this specification and, together with the description, explain the advantages and principles of the invention. In the drawings.

DETAILED DESCRIPTION

Overview

Figure 1:
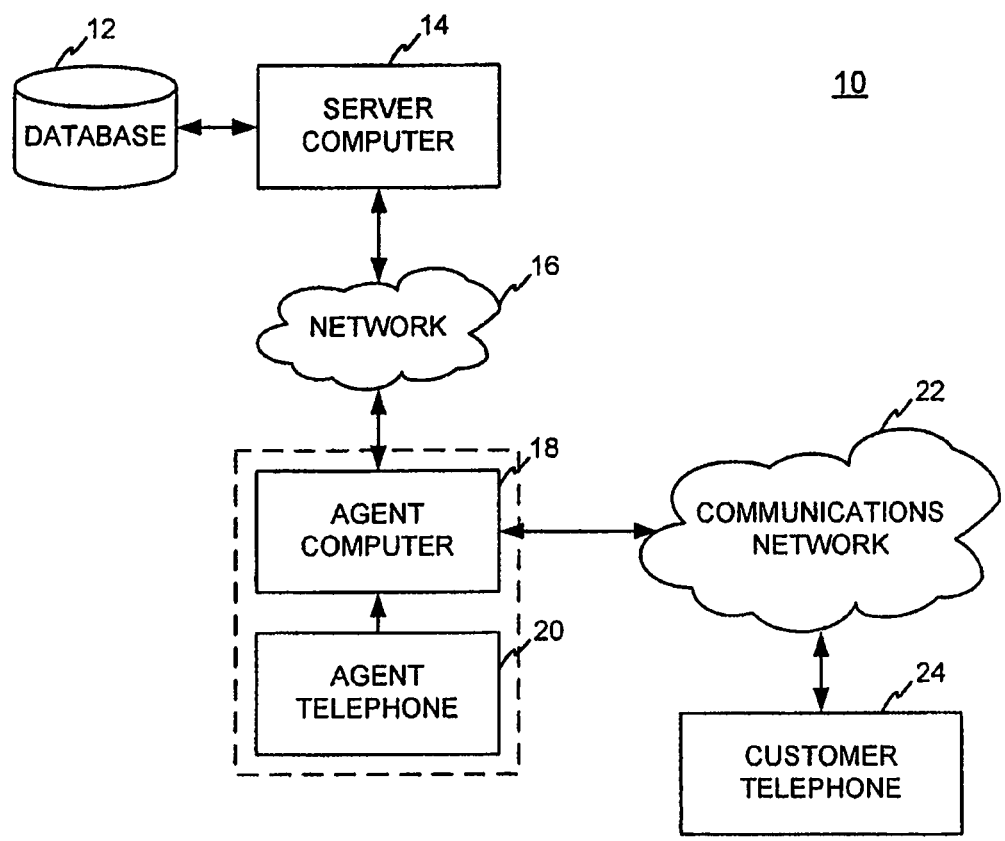
FIG. 1 is a diagram of an exemplary system for processing calls.

The detailed description of exemplary embodiments of the invention herein makes reference to the accompanying drawings and pictures, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented.

Embodiments consistent with the present invention provide for one-to-few or one-to-many comparisons of callers' voice prints with known voice prints to identify any matches between them. A caller's voice print represents an electronic recording of a caller's voice, and the known voice prints represent electronic recordings of persons having a particular known characteristic. For example, the known voice prints can correspond with persons known to have engaged in attempted fraudulent transactions. Alternatively, the characteristic for the known voice prints may relate to other factors or criteria.

When a customer calls a particular entity, such as a customer service center, the system makes a recording of the real-time call including both the customer's and agent's voices. The system segments the recording to extract at least a portion of the customer's voice to create a customer voice print, typically in digital form for computer processing. The system also formats the segmented customer voice print for a network transmission to a server. Although the processing may occur locally, in some embodiments it can occur at a remote server, requiring network transmission of the customer's voice print. Also, the term customer is used for exemplary purposes and is intended to include any type of caller (e.g., merchant, travel agent, cardholder, agent of cardholder, processor, administrator, and/or the like) and any type of communication (e.g., human or electronic voice).

The server compares the customer's voice print with multiple known voice prints to determine any substantial matches, meaning that the customer's voice print and one of the known voice prints are likely from the same person. The identification of any matches can be used for a variety of purposes, such as determining whether to authorize a transaction requested by the customer. For example, a cardholder may call a credit card institution to request replacement of a lost or stolen credit card. The credit card institution wants to ensure that the person calling is the true cardholder and not someone attempting to fraudulently obtain another person's credit card. By comparing the customer's voice print with the multiple known voice prints, associated with persons having attempted fraudulent transactions, the system can determine whether this customer is likely attempting to interact with another person's credit card account based upon any matches with the known voice prints.

As other examples, the system and method disclosed herein may be used to help minimize any fraud related to telephone communications, merchant communications, travel communications, cardholder communications, opening a transaction card account, closing a transaction card account, opening a related transaction account, changing demographic information related to the account and changing financial information related to the transaction card account.

An "account" or "account number", as used herein, may include any device, code, number, letter, symbol, digital certificate, smart chip, digital signal, analog signal, biometric or other identifier/indicia suitably configured to allow the consumer to interact or communicate with the system, such as, for example, authorization/access code, personal identification number (PIN), Internet code, other identification code, and/or the like which is optionally located on a rewards card, charge card, credit card, debit card, prepaid card, telephone card, smart card, magnetic stripe card, bar code card, transponder, radio frequency card and/or the like. The account number may be distributed and stored in any form of plastic, electronic, magnetic, radio frequency, wireless, audio and/or optical device capable of transmitting or downloading data from itself to a second device. A customer account number may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". The first five to seven digits are reserved for processing purposes and identify the issuing bank, card type and etc. In this example, the last sixteenth digit is used as a sum check for the sixteen-digit number. The intermediary eight-to-ten digits are used to uniquely identify the customer. A merchant account number may be, for example, any number or alpha-numeric characters that identifies a particular merchant for purposes of card acceptance, account reconciliation, reporting, or the like.

Network Environment

FIG. 1 is a diagram of an exemplary system 10 for processing calls. System 10 includes an agent computer 18 having a connection via a network 16 with a server computer 14. Agent computer 18 also includes an associated agent telephone or other oral communication device 20. System 10 includes a customer telephone or other oral communication device 24 for a customer or other type of caller to contact an agent at agent telephone 20 via a communications network 22. While the system will be described herein with respect to telephone communications, one skilled in the art will appreciate that any communication device now known or hereinafter developed may also be used in the present invention.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system.

The system may include a host server or other computing systems including a processor for processing digital data, a memory coupled to said processor for storing digital data, an input digitizer coupled to the processor for inputting digital data, an application program stored in said memory and accessible by said processor for directing processing of digital data by said processor, a display coupled to the processor and memory for displaying information derived from digital data processed by said processor and a plurality of databases, said databases including client data, merchant data, financial institution data and/or like data that could be used in association with the present invention. As those skilled in the art will appreciate, user computer will typically include an operating system (e.g., Windows NT, 95/98/2000, Linux, Solaris, etc.) as well as various conventional support software and drivers typically associated with computers. Customer computer can be in a home or business environment with access to a network. In an exemplary embodiment, access is through the Internet through a commercially-available web-browser software package.

Communication between the parties to the transaction and the system of the present invention may be accomplished through any suitable communication means, such as, for example, a telephone network, Intranet, Internet, point of interaction device (point of sale device, personal digital assistant, cellular phone, kiosk, etc.), online communications, off-line communications, wireless communications, transponder communications and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

In use, a customer at customer telephone 24 calls a particular number which facilitates contacting agent telephone 20. For example, the number could include a customer service help line for a particular entity or institution. Although only one agent computer and telephone are shown, system 10 may include multiple agent computers and telephones, such as in a call center, for receiving calls from customers, and a particular customer's call from customer telephone 24 can be routed to an available agent via a switching device such as a private branch exchange (PBX). Upon reaching an agent, customer telephone 24 is in communication with agent telephone 20 via communications network 22. Communication network 22 can include any wireline or wireless network for telephone calls.

As an example, a voice print can be created from a call answered by a voice response or potentially a point of sale system. In this example, a call is answered by a live agent. Alternatively, the agent telephone can be controlled programmatically by the agent computer to record only the caller's voice without a live agent on the call.

During the telephone call, agent computer 18 records at least a portion of the telephone call. The recording, possibly after additional processing, is transmitted via network 16 to server computer 14 for processing of the customer's voice print, as explained below. Server computer 14 can access a database 12 to retrieve information for the processing. Upon completing the processing, server computer 14 can optionally transmit back to agent computer 18 the results of the processing. Network 16 can include any wireline or wireless network for data transmission such as, for example, a Transmission Control Protocol/Internet Protocol (TCP/IP) network.

As described herein, the computing units may be connected with each other via a data communication network. The network may be a public network and assumed to be insecure and open to eavesdroppers. In the illustrated implementation, the network may be embodied as the internet. In this context, the computers may or may not be connected to the internet at all times. For instance, the customer computer may employ a modem to occasionally connect to the Internet, whereas the bank computing center might maintain a permanent connection to the internet. Specific information related to the protocols, standards, and application software utilized in connection with the Internet may not be discussed herein. For further information regarding such details, see, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997). LOSHIN, TCP/IP CLEARLY EXPLAINED (1997). All of these texts are hereby incorporated by reference.

The systems may be suitably coupled to network via data links. A variety of conventional communications media and protocols may be used for data links. Such as, for example, a connection to an Internet Service Provider (ISP) over the local loop as is typically used in connection with standard modem communication, cable modem, Dish networks, ISDN, Digital Subscriber Line (DSL), or various wireless communication methods. Merchant system might also reside within a local area network (LAN) which interfaces to network via a leased line (T1, D3, etc.). Such communication methods are well known in the art, and are covered in a variety of standard texts. See, e.g., GILBERT HELD, UNDERSTANDING DATA COMMUNICATIONS (1996), hereby incorporated by reference.

Agent telephone 20 can receive calls via communications network 22 from a variety of customer telephones. For example, the telephones discussed herein can include a conventional wireline telephone, a wireless or mobile telephone, a speaker phone, an Internet Protocol (IP) telephone, or a personal computer (PC) telephone. In addition, although shown separately in this example, agent telephone 20 and agent computer 18 can be implemented with the same or different physical devices. If agent telephone 20 is implemented with a PC telephone, in a particular embodiment, then that embodiment may not need agent computer 18, as the telephone would contain computing capabilities, and computer 18 may represent a switch in that embodiment to route calls to PC telephone 20.

Figure 2:
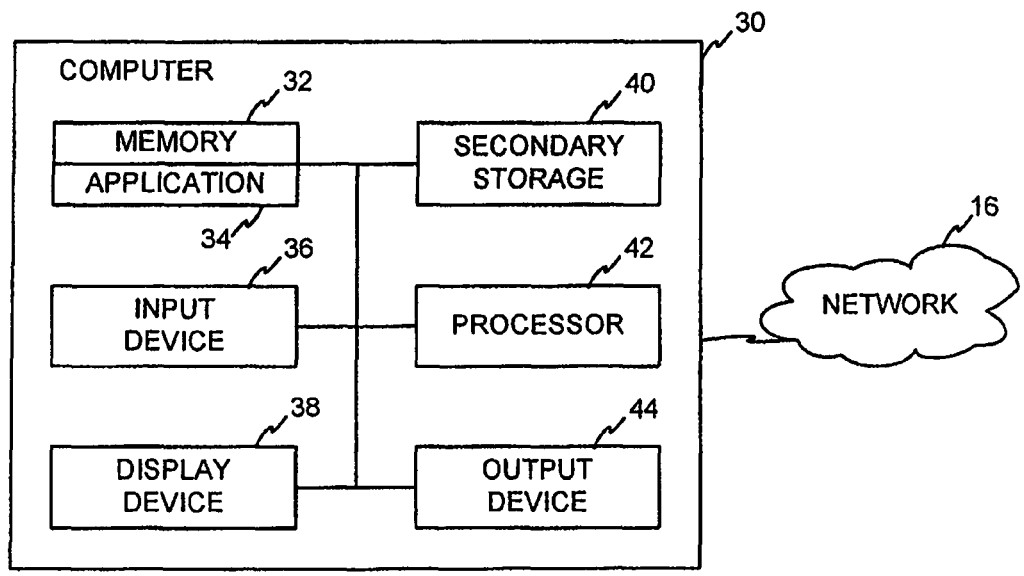
FIG. 2 is a diagram of exemplary components of a computer and server.

FIG. 2 is a diagram of a exemplary computer 30 illustrating typical components of server computer 14 and agent computer 18. Computer 30 can include a connection with network 16 such as the Internet through any suitable network connection. Computer 30 typically includes a memory 32, a secondary storage device 40, a processor 42, an input device 36 for entering information into computer 30, a display device 38 for providing a visual display of information, and an output device 44 for outputting information such as in hard copy or audio form.

Memory 32 may include random access memory (RAM) or similar types of memory, and it may store one or more applications 34 for execution by processor 42. Applications 34 can include a voice component, implemented in software for example, for recognition and processing of voice prints, as explained below. Applications 34 may also include software programs for tone/emotion recognition.

Secondary storage device 40 may include a hard disk drive, floppy disk drive, CD-ROM drive, or other types of non-volatile data storage. Processor 42 may execute applications or programs stored in memory 34 or secondary storage 40, or received from the Internet or other network 16. Although computer 30 is depicted with various components, one skilled in the art will appreciate that the server and agent computers can contain different components.

Display device 38 and output device 44, used in conjunction with applications 34, can be used to show the changing dynamic of a caller's tone. For example, the screen of display device 38 can be programmed to change its background from a neutral color to a more alerting color, perhaps red, to show increasing frustration or anger. Or, output device 44 can be programmed to print an alert message to indicate changes in tone.

Voice Print Comparison Methodology

The exemplary network described above can perform one-to-one, one-to-few or one-to-many comparisons of voice prints between callers and known voice prints. In one embodiment with one-to-many comparisons, the comparison can determine whether a caller's voice print matches any of the known voice prints in the database. The known voice prints can correspond with any particular criteria. For example, the known voice prints may correspond with individuals known to have attempted fraudulent transactions in the past. Therefore, by knowing if a caller's voice print matches any of the known voice prints, in this example, the system can provide an indication of whether this particular caller will likely attempt a fraudulent transaction.

In one embodiment, the processing for recording callers' voice prints and making the comparison typically occurs at both agent computer 18 and server computer 14. However, the processing may occur remotely at server computer 14, locally at agent computer 18, or divided among multiple computers.

The present invention may be described herein in terms of functional block components, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a client-side scripting language, such as JavaScript, VBScript or the like. For a basic introduction of cryptography and network security, the following may be helpful references: (1) "Applied Cryptography: Protocols, Algorithms, And Source Code In C," by Bruce Schneier, published by John Wiley & Sons (second edition, 1996); (2) "Java Cryptography" by Jonathan Knudson, published by O'Reilly & Associates (1998); (3) "Cryptography & Network Security: Principles & Practice" by William Stalling, published by Prentice Hall; all of which are hereby incorporated by reference.

It will be appreciated, that many applications of the present invention could be formulated. One skilled in the art will appreciate that the network may include any system for exchanging data or transacting business, such as the Internet, an intranet, an extranet, WAN, LAN, satellite communications, and/or the like. It is noted that the network may be implemented as other types of networks, such as an interactive television (ITV) network. The users may interact with the system via any input device such as a keyboard, mouse, kiosk, personal digital assistant, handheld computer (e.g., Palm Pilot®), cellular phone and/or the like. Similarly, the invention could be used in conjunction with any type of personal computer, network computer, workstation, minicomputer, mainframe, or the like running any operating system such as any version of Windows, Windows NT, Windows2000, Windows 98, Windows 95, MacOS, OS/2, BeOS, Linux, UNIX, Solaris or the like. Moreover, although the invention is frequently described herein as being implemented with TCP/IP communications protocols, it will be readily understood that the invention could also be implemented using IPX, Appletalk, IP-6, NetBIOS, OSI or any number of existing or future protocols.

Figure 3:
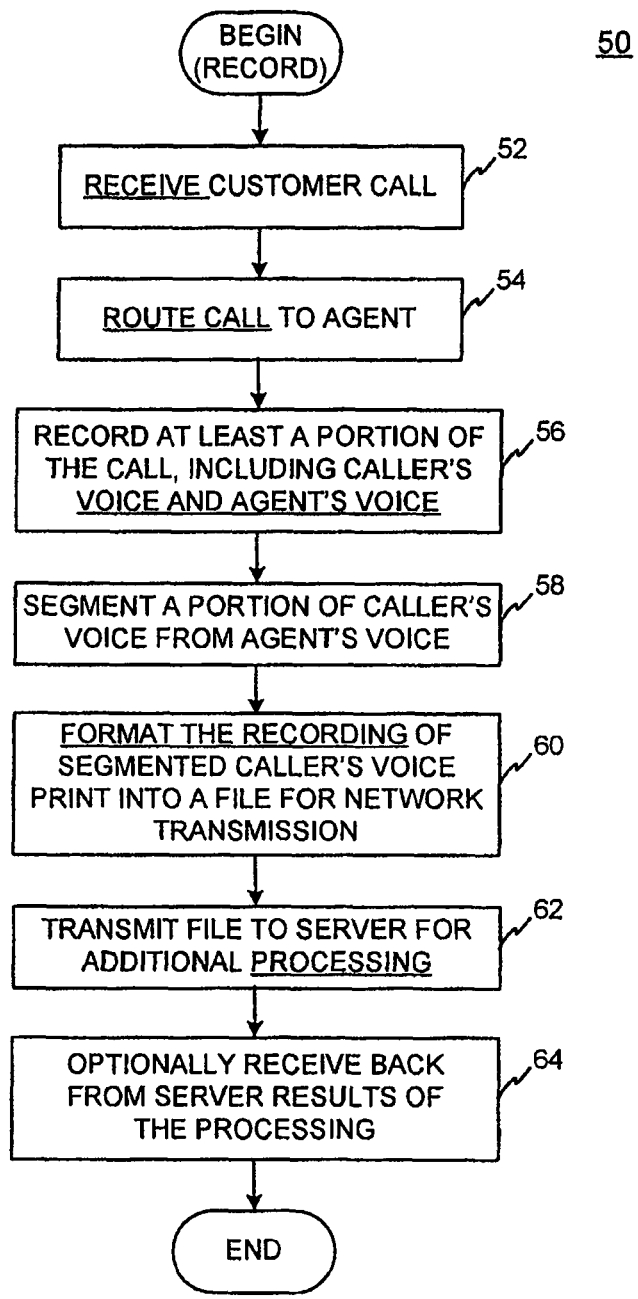
FIG. 3 is a flow chart of an exemplary method for recording calls for processing.

FIG. 3 is a flow chart of an exemplary recording method 50 for recording calls for processing. Method 50 can be implemented in, for example, hardware and/or software modules for execution by agent computer 18. The various steps of method 50, and other described methods, are shown in a particular order for illustrative purposes. The steps may occur in a different order and steps may be added or eliminated from the methods, depending upon a particular implementation, for example.

In method 50, a customer call is received from customer telephone 24 via communications network 22 (step 52). As indicated above, this call can be received from a variety of types of telephones or other communications devices via any communications network. The customer call is routed to agent telephone 20 (step 54), such as via a PBX or other switching device in that system 10 typically includes many agent computers and telephones for processing customer calls.

During the telephone call, agent computer 18 records at least a portion of the call, including both the agent's and caller's (customer's) voice (step 56). Agent computer 18, via a connection with agent telephone 20, can receive an analog signal representing the real-time telephone call and can digitize and store it for processing. Agent computer 18 segments at least a portion of the caller's voice from the agent's voice (step 58). The segmentation refers to identifying within the recording at least a portion representing the caller's voice and extracting it from the recording. Therefore, the segmented recording includes an electronic representation of only the caller's voice, possibly with background noise. Algorithms are known in the art for performing this type of segmentation. Each person's voice has a unique voice print, due to for example the various combinations of frequencies within each person's voice, and thus one person's voice can be extracted from a recording containing multiple voice recordings.

The recording of the segmented caller's voice is formatted by agent computer 18 for transmission via network 16 (step 60). For example, it can be formatted into a way file, known in the art and identified by a .wav extension. The use of a way file, for example, provides for a standard format for network transmission to server computer 14. Alternatively, the recording can be formatted into any type of file that can be transmitted via a TCP/IP or other network.

Agent computer 18 transmits the file, having the recorded caller's voice print, to server computer 14 for processing (step 62), explained below. Agent computer 18 can optionally receive back from server computer 14 results of the processing (step 64). For example, an agent at agent computer 18 may want to receive the results while still engaged in a telephone call with a customer at customer telephone 24. The agent can potentially use those results during the telephone call to determine whether to authorize a transaction requested by the customer such as, for example, opening a transaction card account, closing a transaction card account, opening a related transaction account, changing demographic information related to an account and changing financial information related to a transaction card account.

Figure 4:
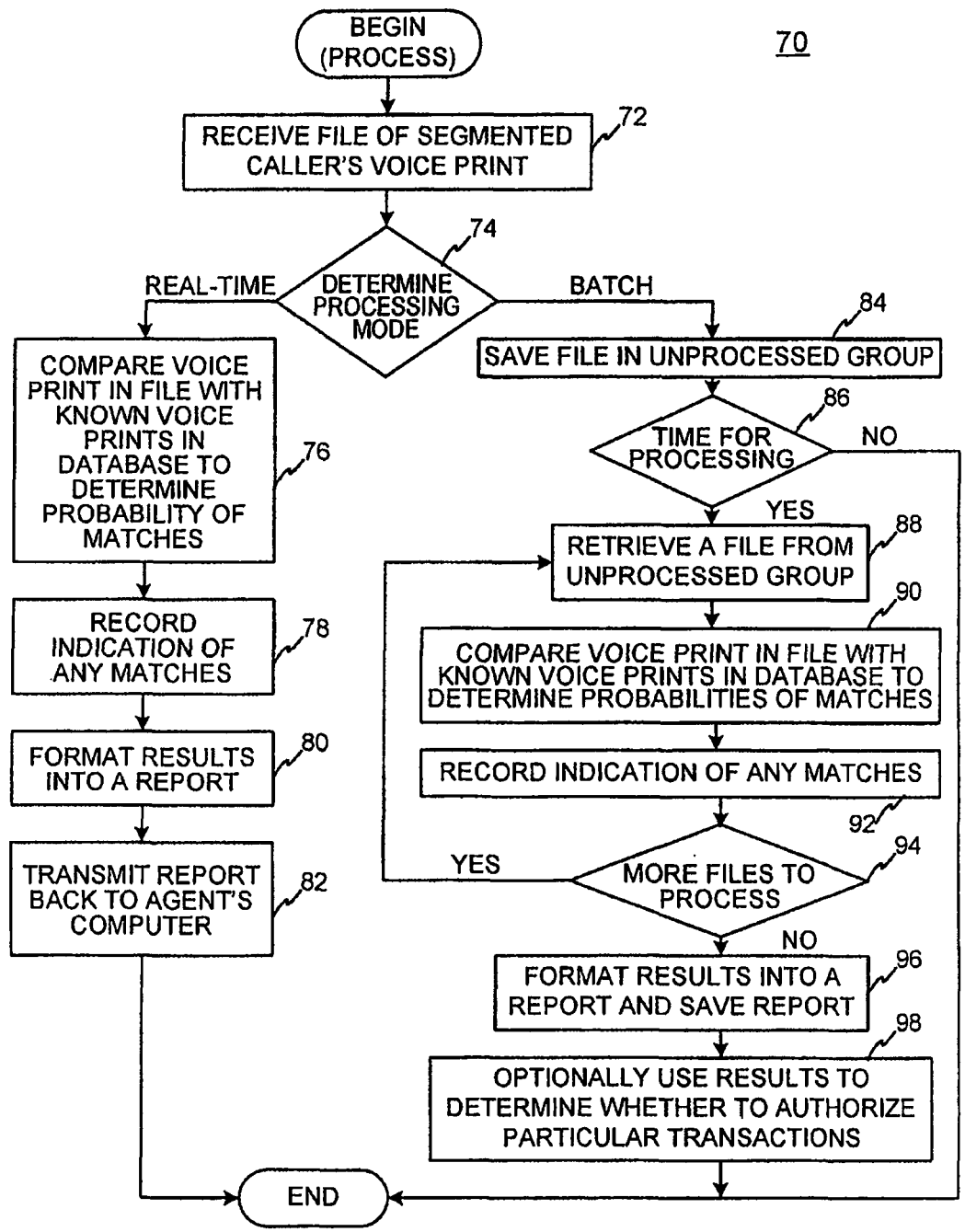
FIG. 4 is a flow chart of an exemplary method for processing calls by comparing caller voice prints with known voice prints.

FIG. 4 is a flow chart of a method 70 for processing calls by facilitating the comparison of at least a portion of caller voice prints with known voice prints. Method 70 can be implemented in, for example, software modules for execution by server computer 14. In method 70, server computer 14 receives a file via network 16 from agent computer 18 (step 72). The file contains a voice print of the caller's voice, formatted for example in a way file. In an exemplary embodiment, server computer 14 can possibly operate in at least two modes, real-time and batch processing, as determined in step 74. The real-time mode refers to almost immediately processing the caller's voice print upon receipt and providing results of the processing back to the agent, typically while still engaged in a telephone call with the customer. The batch processing mode refers to saving the file for later processing with a group of files. The batch processing has the advantage of processing many files at once, during a particular time, and thus more efficiently making use of the processing capability of server computer 14.

The particular mode selected can be based upon any particular criteria. For example, server computer 14 may by default operate in the batch processing mode but could be switched to the real-time mode by an agent for a particular customer's voice print. Alternatively, server computer 14 can be programmed to operate in one or both the modes based upon a desired application.

Database 12 can store the known voice prints in any particular data structure and format. In addition, it can also associate other information with each of the voice prints, such as an identification of the person corresponding with each voice print and characteristics of the person. For example, the characteristics can include the types of fraudulent transactions attempted by the corresponding person. Any databases discussed herein may be any type of database, such as relational, hierarchical, object-oriented, and/or the like. Common database products that may be used to implement the databases include DB2 by IBM (White Plains, N.Y.), any of the database products available from Oracle Corporation (Redwood Shores, Calif.), Microsoft Access or MSSQL by Microsoft Corporation (Redmond, Wash.), or any other database product. Database may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

Table 1 illustrates an example of how database 12 can store the known voice prints.

TABLE 1

| Known Voice Prints | | |
|---|---|---|
| wav file for voice print #1 | ID of voice print #1 | characteristics for voice print #1 |
| wav file for voice print #2 | ID of voice print #2 | characteristics for voice print #2 |
| ... | | |
| wav file for voice print #N | ID of voice print #N | characteristics for voice print #N |

In the real-time mode, server computer 14 compares the caller's voice print with the known voice prints in database 12 (step 76). For example, the comparison step 76 can include determining a match between the caller's voice print and one of the known voice prints based upon a probability, greater than a particular threshold, that the caller voice print and one of the known voice prints are from a voice of the same person. Therefore, the comparison seeks to determine whether the caller's voice print and any of the known voice prints are likely from the same person. Algorithms are known in the art for performing this type of comparison and can include, for example, statistical analysis between the voice prints. This comparison is typically performed sequentially between the caller's voice print and each of the known voice prints.

Server computer 14 records an indication of any matches found as a result of the comparison (step 78). Server computer 14 formats the results into a report (step 80) and transmits the report back to agent computer 18 via network 16 (step 82). Examples of reports are provided below. For step 82, the report may be transmitted back to the live agent handling the corresponding telephone call; alternatively, the report can be transmitted to other agents or entities for processing.

In the batch processing mode, server computer 14 saves the received file in a group of unprocessed files (step 84), possibly in database 12. Server computer 14 determines if it is time for batch processing of the group of unprocessed files (step 86). The batch processing can occur at a time based upon any particular parameters. For example, server computer 14 may be programmed to process, at a particular time each day, the group of files saved since the previous processing of files. Alternatively, server computer can process the group of unprocessed files at multiple times during each day or every multiple days. One advantage of this batch processing is that it can be performed at a time of day, for example, when server computer 14 typically has greater bandwidth.

When it is time for batch processing, server computer 14 retrieves a file from the group of unprocessed files (step 88) and compares the voice print in the file with the known voice prints in database 12 (step 90). The comparison can include the same processing described with respect to step 76. Server computer 14 records an indication of any matches from the comparison (step 92). If there are more files in the group to be processed (step 94), server computer 14 repeats steps 88, 90, and 92 for the next file. Once the group of unprocessed files have all been processed, server computer 14 formats the results into a report and saves them (step 96). Server computer 14 can optionally use the results of processing to determine whether to authorize particular transactions for customers relating to the recorded voice prints in the processed files (step 98). For example, it can automatically and programmatically deny the requested transaction if any matches are found for the caller voice print in question.

Figure 5:
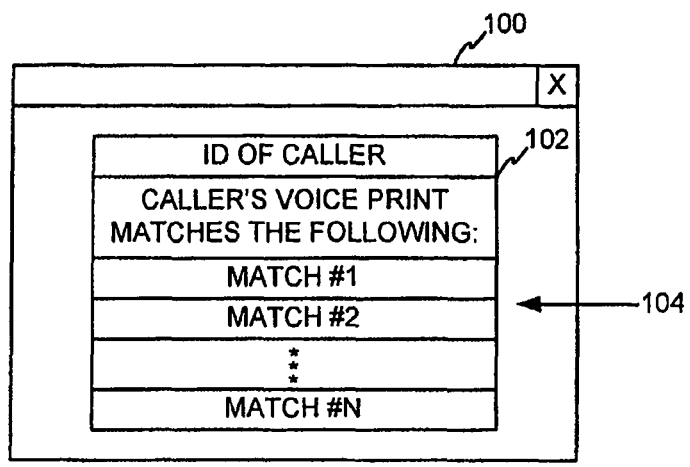
FIG. 5 is a diagram of an exemplary report for providing results of the processing.

FIG. 5 is a diagram of an exemplary report 100 for providing results of the processing in steps 80 and 96. Report 100 can be formatted in, for example, a web page or screen using HyperText Markup Language (HTML) for display on the agent computer 18 or server computer 14 using a web browser. It can alternatively be formatted in any type of electronic screen. Report 100 includes, for example, a section 102 providing an identification of a particular customer whose voice print was recorded. A section 104 can display identifications of known voice prints in database 12 that match the caller's voice print. In addition, other information concerning the matches can optionally be displayed as well.

The computers discussed herein may provide a suitable website, webpage or other Internet-based graphical user interface which is accessible by users. In one embodiment, the Internet Information Server, Microsoft Transaction Server, and Microsoft SQL Server, are used in conjunction with the Microsoft operating system, Microsoft NT web server software, a Microsoft SQL database system, and a Microsoft Commerce Server. Additionally, components such as Access or SQL Server, Oracle, Sybase, Informix MySQL, Intervase, etc., may be used to provide an ADO-compliant database management system. The term "webpage" as it is used herein is not meant to limit the type of documents and applications that might be used to interact with the user. For example, a typical website might include, in addition to standard HTML documents, various forms, Java applets, Javascript, active server pages (ASP), common gateway interface scripts (CGI), extensible markup language (XML), dynamic HTML, cascading style sheets (CSS), helper applications, plug-ins, and the like. A server may include a webservice which receives a request from a browser which includes a URL (http://yahoo.com/stockquotes/ge) and an IP address (123.56.789). The webservice retrieves the appropriate webpages and sends the webpages to the IP address.

Table 2 illustrates a more detailed exemplary format for report 100 containing results of the processing. A caller's voice print might typically match only one of the known voice prints, as the known voice prints may be from different persons. However, it is possible that one person can have multiple voice prints in database 12 of known voice prints, making multiple matches with the caller's voice print a possibility. In addition, the system can be configured to provide a degree of reliability for each match, again providing for multiple matches based upon multiple degrees of reliability. For example, the system might discover a match having a 95% degree of reliability, meaning that statistically there is a 95% probability that the caller's voice print and the matched known voice print are from the same person. If configured in this manner, report 100 (and Table 2) can include a section to identify the degree of reliability for each of the matched known voice prints.

In Table 2, the IDs for the matches can include optional information for identifying a person corresponding with the matched voice print. The characteristics for the matches can include, for example, the types of fraudulent transactions attempted by the corresponding person, as shown in Table 1. Also, additional information can be associated with each report, if desired.

TABLE 2

Report for Results Voice Print Comparisons

| caller ID | time/date of call | transaction requested |
|---|---|---|
| | Voice Print Matches | |
| match #1 | ID of match #1 | characteristics for match #1 |
| match #2 | ID of match #2 | characteristics for match #2 |
| ... | | |
| match #N | ID of match #N | characteristics for match #N |

Report 100 can be represented in a variety of formats. It can be presented in any electronic form or, alternatively, in a hard copy or other format. For example, it can be a web page for transmission via network 16 and display on agent computer 20 or server computer 14 using a web browser. If represented electronically, report 100 can be e-mailed to the agent at agent computer 18 or any particular subscribers to it. If the processing occurs in the real-time mode, report 100 can be transmitted and displayed to the agent in, for example, a pop-up window on agent computer 18. Therefore, the agent can view results of the processing, most likely while still engaged in a telephone call with a customer, and use those results to determine whether to authorize a transaction requested by the customer.

The results of the processing can be used for a variety of purposes. For example, they can be used to determine whether to authorize a transaction or request, or verify the identity of the caller. As other examples, they can be used to help prevent any telephone fraud, merchant fraud, travel fraud, or cardholder fraud, possibly in step 82 of process method 70. In particular, if the caller's voice print matches any of the voice prints of persons known to have attempted to engage in fraudulent transactions, as determined by the processing explained above, the caller can be refused authorization to engage in any merchant, travel, or cardholder transaction.

The information in the reports from results of the processing can also be stored in database 12, or other location, and used for data mining purposes. For example, various types of processing can occur using the stored data to generate statistical analysis of it.

While the present invention has been described in connection with an exemplary embodiment, it will be understood that many modifications will be readily apparent to those skilled in the art, and this application is intended to cover any adaptations or variations thereof. For example, various types of caller phones, communications networks, and hardware and software implementations of the voice print comparisons and processing may be used without departing from the scope of the invention. This invention should be limited only by the claims and equivalents thereof.

The invention claimed is:

1. A method, comprising:
    receiving, by a computer system, a speaker voice print to be analyzed;
    comparing the speaker voice print to a database of known voice prints; and
    determining, by the computer system, to deny a transaction requested by a speaker corresponding to the speaker voice print, wherein the determining is based on the speaker voice print being a match of one or more known voice prints of the database of known voice prints.

2. The method of claim 1, wherein the speaker voice print being a match of the one or more known voice prints of the database is based on a match probability exceeding a particular threshold.

3. The method of claim 1, further comprising:
    receiving the speaker voice print from a computer system associated with a customer service representative; and
    performing the comparing of the speaker voice print.

4. The method of claim 1, further comprising transmitting, to a computer system associated with a customer service representative, information indicating the speaker has matched the one or more known voice points in the database.

5. The method of claim 4, wherein the information is transmitted to the computer system associated with the customer service representative during a phone call between the speaker and the customer service representative.

6. The method of claim 1, further comprising extracting the speaker voice print from an audio recording containing audio of both the speaker and a customer service representative.

7. The method of claim 1, wherein the one or more known voice prints correspond to one or more persons known to be associated with one or more attempted fraudulent transactions.

8. The method of claim 1, further comprising receiving information indicating that one or more prior transactions corresponding to the one or more known voice prints were fraudulent transactions, wherein determining to deny the transaction is based on the received information.

9. The method of claim 1, further comprising causing the speaker voice print to be stored in the database of known voice prints based on an indication that the speaker voice print does not correspond to an authorized speaker.

10. The method of claim 1, wherein the transaction comprises a request to open a new transaction account, to close an existing transaction account, to change demographic information related to the existing transaction account, to change financial information related to the existing transaction account, or a combination thereof.

11. A system comprising:
a processor; and
a storage device having instructions stored thereon that are executable by the processor to cause the system to perform operations comprising:
receiving a speaker voice print;
matching the speaker voice print to one or more known voice prints of a database of known voice prints; and
initiating a denial of a transaction based on the speaker voice print being a match of the one or more known voice prints.

12. The system of claim 11, wherein matching the speaker voice print comprises determining that the speaker voice print corresponds to the one or more known voice prints with at least a particular level of certainty.

13. The system of claim 12, wherein the particular level of certainty is 95%.

14. The system of claim 11, wherein initiating the denial of the transaction comprises providing an agent an indication that the speaker voice print matches the one or more known voice prints.

15. A non-transitory computer-readable medium having instructions stored thereon that are executable by a computer system to cause the computer system to perform operations comprising:
receiving a speaker voice print to be analyzed;
identifying a match between the speaker voice print and at least one known voice print of a database of known voice prints based on the speaker voice print corresponding to the at least one known voice print with at least a threshold probability level; and
based on the identified match between the speaker voice print and the at least one known voice print, initiating a denial of a transaction requested by a speaker corresponding to the speaker voice print.

16. The non-transitory computer-readable medium of claim 15, wherein the operations further comprise receiving the speaker voice print from a computer system associated with an agent of a credit card issuer.

17. The non-transitory computer-readable medium of claim 15, wherein initiating the denial of the transaction includes causing the transaction to be denied after completion of an audio discussion between the speaker and a customer service representative.

18. The non-transitory computer-readable medium of claim 15, wherein the operations further comprise:
receiving an audio segment including the speaker voice print and an agent voice print; and
separating the speaker voice print from the agent voice print.

19. The non-transitory computer-readable medium of claim 15, wherein the operations further comprise determining that the speaker is associated with one or more fraudulent transactions corresponding to an account different from an account associated with the transaction requested by the speaker.

* * * * *